United States Patent
Kershman et al.

(10) Patent No.: US 12,284,980 B2
(45) Date of Patent: Apr. 29, 2025

(54) COMPRESSIBLE ANIMAL LITTER

(71) Applicant: Boxiecat LLC, Santa Monica, CA (US)

(72) Inventors: Alvin Kershman, St. Louis, MO (US); Josh Wiesenfeld, Santa Monica, CA (US); Jeff Shear, Bonita Springs, FL (US); Harold Cole, St. Louis, MO (US)

(73) Assignee: Boxiecat, LLC, Santa Monica, CA (US)

( * ) Notice: Subject to any disclaimer, the term of this patent is extended or adjusted under 35 U.S.C. 154(b) by 125 days.

(21) Appl. No.: 17/981,173

(22) Filed: Nov. 4, 2022

(65) Prior Publication Data
US 2023/0140299 A1    May 4, 2023

Related U.S. Application Data

(60) Provisional application No. 63/275,569, filed on Nov. 4, 2021.

(51) Int. Cl.
A01K 1/015    (2006.01)

(52) U.S. Cl.
CPC ........ A01K 1/0155 (2013.01); *B32B 2266/00* (2013.01); *B32B 2266/0278* (2013.01)

(58) Field of Classification Search
CPC ................ A01K 1/0155; B32B 5/18; B32B 2264/2031; B32B 2264/1027; B32B 2266/0278; B32B 2307/726
See application file for complete search history.

(56) References Cited

U.S. PATENT DOCUMENTS

| | | | | |
|---|---|---|---|---|
| 5,207,830 A | * | 5/1993 | Cowan | B01J 20/28016 428/404 |
| 2003/0191204 A1 | * | 10/2003 | Hermann | C11D 17/042 521/50 |
| 2005/0037189 A1 | * | 2/2005 | Green | F16F 7/00 428/314.4 |
| 2005/0266230 A1 | * | 12/2005 | Hill | B32B 5/18 428/317.9 |
| 2007/0148432 A1 | * | 6/2007 | Baker | B32B 5/14 521/50 |
| 2007/0181071 A1 | * | 8/2007 | Hurwitz | A01K 1/0152 119/171 |
| 2008/0139378 A1 | * | 6/2008 | Hildebrand | A01K 1/0152 502/1 |
| 2011/0185978 A1 | * | 8/2011 | Dixon | A01K 1/0152 119/173 |
| 2016/0044891 A1 | * | 2/2016 | Kuras | A01K 1/0154 119/173 |
| 2016/0135421 A1 | * | 5/2016 | Cortner | A01K 1/0155 119/172 |
| 2016/0193091 A1 | * | 7/2016 | Hegde | A61F 13/534 156/244.11 |
| 2021/0053312 A1 | * | 2/2021 | Ruiz | B32B 3/08 |

FOREIGN PATENT DOCUMENTS

EP    0528660 A2 *    2/1993    ........... A01K 1/0155

* cited by examiner

Primary Examiner — Magdalena Topolski
Assistant Examiner — Katherine June Walter
(74) Attorney, Agent, or Firm — Linda L. Lewis

(57) ABSTRACT

An animal litter product comprising a foam polymer, wherein the foam polymer is compressible, resilient and has a density in the range of about of about 325 to 650 kg/m$^3$, wherein the foamed polymer has limited compressibility and returns to approximately its original volume, wherein, optionally, the foam polymer is blended with other animal litter components, such as clays or other absorbent materials.

18 Claims, No Drawings

COMPRESSIBLE ANIMAL LITTER

CROSS-REFERENCE TO RELATED APPLICATIONS

This application claims the benefit of provisional patent application 63/275,569 filed Nov. 4, 2021, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to animal litter, and more particularly to animal litter that is compressible for shipping. The compressible litter contains a compressible, resilient foam polymer.

Related Art

Prior art animal litter, pet litter and cat litter are well-known in the art. The properties of desirable animal litter are absorbency, clumping and odor control.

Neither of the references below disclose animal litter that is compressible for shipping purposes. Shipping of pet litter can be a significant cost of the final product. If the volume of the product can be reduced, the shipping costs can also be reduced. The product needs to also be resilient, in that after the compression force is released, the foam is resilient and returns to approximately its original volume.

U.S. Pat. No. 3,765,371 discloses the use of foamed plastic particles in cat litter. The '371 patent discloses the foamed plastic being washed and re-used as litter. The plastic materials disclosed in '371 have high surface area and the ability to effectively absorb urine or excrement. The foamed plastics have a low weight per unit of absorbing volume, thus minimizing the costs of shipping and distribution. The '371 patent fails to mention resilient, compressible foam. While the plastic foams listed, which are (rigid) polyvinylchloride foam, (rigid) polystyrene foam, also known as STYROFOAM®, (rigid) cellular cellulose acetate resin, (rigid) foamed phenolic resin, and polyurethane foam are disclosed, there is no mention of compressible or resilient foam. Of the listed foams, only polyurethane foam is known as a resilient foam as well as a rigid foam, and for the purposes of '371, it is assumed to be a rigid since the other four listed foams are rigid. Such rigid foams are neither compressible nor resilient.

The densities of the foams of '371 are not disclosed. The patent does state that the foam is low weight, which saves shipping costs, but fails to define what density exactly is low weight. The present invention is directed toward compressible, resilient animal litter, and density is an important consideration, in that too low density foam fails to provide a desirable cat litter, in that too low density foam makes an uncomfortable litter for cats to walk in, and whose paws sink through it into the litter. Additionally, when cats scratch to cover their feces, the low density foam scatters out of the box or clings to the paws. Too high a density foam is not compressible. The preferred density range is about 325 to 650 $kg/m^3$.

WO2008007963 discloses cat litter containing rigid protein-based foam, as well as other rigid foams.

Neither of the above references disclose nor suggest the use of compressible, resilient foam polymers in animal litter.

SUMMARY OF THE INVENTION

An animal litter product comprising a foam polymer, wherein the foam polymer is compressible and resilient foam having a density in the range of about 325 to 650 $kg/m^3$. The claimed animal litter is also not too compressible, whereas when used by an animal, such as a cat, the animal's paws sink too deeply into the litter. Limited compressibility is needed, or the animal will not use the litter will, since it is uncomfortable walking on it. The preferred resilient foam polymer can be compressed by less than about 10% or more by volume when tested with a pressure of about 1 kg/4 $cm^2$ pressure. Preferably, the compressibility is from about 4 to 10% by volume.

In a preferred embodiment, the foam polymer is blended with other animal litter components, such as clays or other absorbent materials. To prevent particle segregation, where the particles separate after mixing or storage, the ratio of the density of the foam to the density of the other animal litter must fall within the range of from about 1:10 to about 1:1.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The preferred compressible, resilient foam has a density in the range of about 325 to 650 $kg/m^3$. The upper limit to the density of the foam relates to its compressibility. Very high density (greater than 650 $kg/m^3$) foam loses the ability to compress. Density of less than about 325 $kg/m^3$ causes the foam to compress too much and the animal's paws sink into the foam too much, making the animal unwilling to walk on it. In a preferred embodiment, the foam density is from about 325 to 550 $kg/m^3$.

The preferred foam compresses about 10% or less by volume when compressed by about 1 kg/4 $cm^2$. This embodiment was determined by determining the point compression of the average house cat, which weighs from about 4 to 5 kg. The compression for a four pawed animal would be about 1 kg. The approximate area of the footprint is 4 $cm^2$. Because it is desirable for the cat's paws to not sink down into the litter excessively, nor scatter from the litter box, about a 10% compression or less is desirable at a pressure of 1 kg/4 $cm^2$. In a preferred embodiment, the compression of volume is from about 4 to 8%.

With the preferred foam, the animal litter can be compressed for shipping and return to approximately its original volume when unpacked and uncompressed. The size of the foam particles can vary from about 0.25 inch to about 0.50 inch. Preferably, the size is from about 0.25 inch to about 0.37 inch. In an embodiment, the foam is not absorbent.

In a preferred embodiment, the foam is a polyhedron i.e., a three dimensional particle having sides of polygons. Preferably, the polygons are approximately rectangular. This shape allows the litter to align when dispensed into a litter box, and reduces excessive compression. When compared to shredded (irregularly shaped) pieces of foam, the polyhedron shaped foam compressed less at a pressure of 1.0 kg/4 cm$^2$. Preferably, the dimensions of the polygon are less than 0.5 inch. More preferably, they are less than about 0.37 inches. Most preferably the rectangular polygon is from about 0.37 to about 0.10 inches in dimension.

The preferred resilient, compressible foam is polyurethane foam. Examples of the preferred polyurethane foams are Poron 4701-40-20125 soft001, unsupported, having a density of 333 kg/m$^3$, and Comcast Urethane having a density of 519 kg/m$^3$.

The claimed resilient, compressible foam used in the present animal litter does not include rigid foams, such as rigid polyvinylchloride, rigid polystyrene foam, rigid cellular cellulose acetate resin, rigid foamed phenolic resin, and rigid polyurethane foam. Further not included in the claimed resilient, compressible foam is sponge cellulose (98% cellulose) having a density of about 35 kg/m$^3$.

The animal litter made of the present resilient, compressible foam is completely dust-free.

In a preferred embodiment, the compressible foam animal litter is wrapped in a flexible air-tight container that is compressed, the excess air removed, and the container vacuum sealed. To use the animal litter, the container is opened, allowing air to enter, and the litter placed in the desired container for use, such as a cat litter box.

In an embodiment, the foam is made by cutting or shredding large blocks of foam into the desired size. Alternatively, the foam pieces can be extruded or molded. In a more preferred embodiment, the foam particles are made by spray drying the polyol/isocyanate mixture (which makes the polyurethane foam) to form roughly spherical polyurethane foam particles.

In a preferred embodiment, the foam of the present invention is combined with other well-known non-foam animal litter components, such as liquid-absorbing clay materials which may be used without departing from the spirit and scope of the present invention. The weight ratio of foam to non-foam animal litter component is in the range of about 10:1 to 1:10.

To prevent particle segregation, where the particles separate after mixing or storage, the ratio of the density of the foam to the density of the other litter components must fall within the range of from about 1:10 to about 1:1.

Suitable absorbent clays include but are not limited to bentonites, attapulgite, montmorillonite diatomaceous earth, Georgia White clay, sepiolite, slate, pumice, tobermite, marls, kaolinite, halloysite, smectite, hectorite, Fuller's earth, zeolites and mixtures thereof. Clays typically have a density in the range of about 800 to 2000 kg/m3. In addition to clays, fillers such as limestone, sand, calcite, dolomite, recycled waste materials, zeolites, and gypsum can be used with the clays.

Other absorbent materials are also contemplated in this invention, including, but not limited to rice, shells of nuts, recycled corrugated box, byproducts and pulp, barley, wheat, corn, tofu, wood, paper, and other plant-based materials, and silica gel.

Other materials include but are not limited to antimicrobials, odor absorbers/inhibitors, binders, fragrances, health indicating materials, nonstick release agents, superabsorbent materials, and mixtures thereof. Antimicrobial actives include boron containing compounds such as borax pentahydrate, borax decahydrate, boric acid, polyborate, tetraboric acid, sodium metaborate anhydrous, boron components of polymers, and mixtures thereof.

Odor absorbing/inhibiting actives include water soluble metal salts such as silver, copper, zinc, iron, and aluminum salts and mixtures thereof. Zinc chloride, zinc gluconate, zinc lactate, zinc maleate, zinc salicylate, zinc sulfate, zinc ricinoleate, copper chloride, copper gluconate, and mixtures thereof are effective. Other odor control actives include metal oxide nanoparticles. Additional types of odor absorbing/inhibiting actives include cyclodextrin, zeolites, activated carbon, acidic, salt-forming materials, and mixtures thereof. The active may be calcium bentonite added to reduce sticking to a litter box.

The active may also include a binder such as water, lignin sulfonate (solid), polymeric binders, fibrillated Teflon® (polytetrafluoroethylene or PTFE), and combinations thereof. Useful organic polymerizable binders include, but are not limited to, hydroxypropylcellulose (HPC), hydroxypropylmethylcellulose (HPMC), carboxymethylcellulose (CMC) and its derivatives and its metal salts, guar gum cellulose, xanthan gum, starch, lignin, polyvinyl alcohol, polyacrylic acid, styrene butadiene resins (SBR), and polystyrene acrylic acid resins. Water stable particles can also be made with crosslinked polyester network, including but not limited to those resulting from the reactions of polyacrylic acid or citric acid with different polyols such as glycerin, polyvinyl alcohol, lignin, and hydroxyethylcellulose.

Dedusting agents can also be added to the particles in order to reduce the dust level. Many of the binders listed above are effective dedusting agents when applied to the outer surface of the composite absorbent particles. Other dedusting agents include but are not limited to gums, resins, water, and other liquid or liquefiable materials.

EXAMPLES OF THE INVENTION

Sponge Cellulose (Control 1), Poron 4701-40-20125 soft001, unsupported (Example 1), and Comcast Urethane (Example 2) foam samples were tested for density, compressibility and resilience as follows:

Density Test—a sample of each foam polymer was measured and weighed. The density was calculated as mass/volume and recorded in kg/m$^3$. See Table 1.

Compressibility Test—a sample of Control 1, Example 1 and Example 2 were tested for compressibility by taking a sample of 2 cm×2 cm×1.2 cm and measuring the height using a caliper. An approximately 1 kg weight was placed on the sample and the height measured a second time. The difference in height was calculated, and the % volume lost determined. See Table 1.

Resilience was determined by measuring the height again 24 hours after the weight in the Compressibility Test was removed. See Table 1.

TABLE 1

Foam Samples

| Test/Foam Sample | Control 1 Sponge Cellulose | Example 1 Poron Polyurethane | Example 2 Comcast Polyurethane |
|---|---|---|---|
| Density (kg/m$^3$) | 35 (too low) | 333 | 519 |
| Compressibility (volume lost %) | — Test was not reproducible | 5.61 | 6.63 |
| Resilience (initial volume regained %) | — Sample did not show resilience | ~100 | ~100 |

Control 1 had density that was far too low for the claimed animal litter. Examples 1 and 2 had the desired density, compressibility and resilience.

When used as cat litter, Example 2 was found to be effective.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An animal litter comprising a foam polymer,
wherein the foam polymer is compressible and resilient foam having a density in the range of about 325 to 650 kg/m$^3$;
wherein the foam polymer has limited compressibility when a weight is applied;
wherein the weight is an about 1 kg weight;
wherein the 1 kg weight is applied to a 2 cm×2 cm×1.2 cm sample of the foam polymer; and
wherein the volume of the foam polymer is compressed by less than about 10%;
wherein the foam polymer returns to approximately its original volume when the weight is removed;
wherein the foam polymer is formed into particles of about 0.5 inches or less; and
wherein the animal litter is liquid-absorbent.

2. The animal litter of claim 1, wherein the volume of the foam polymer is compressed from about 4 to 8%.

3. The animal litter of claim 2, wherein the animal litter is completely dust-free; and
wherein the foam polymer is a mixture of foam polymers.

4. The animal litter of claim 1, wherein the foam polymer is a polyurethane foam.

5. The animal litter of claim 4, wherein the foam polymer is cut, shredded, extruded, molded, or spray dried to particles of from about 0.1 to 0.375 inches.

6. The animal litter of claim 5, wherein the foam polymer particle shape is a polyhedron.

7. The animal litter of claim 6, wherein the foam polymer particle shape is a rectangular polyhedron.

8. An animal litter comprising:
a liquid-absorbent foam polymer,
wherein the liquid-absorbent foam polymer is compressible and resilient foam having a density in the range of about 325 to 650 kg/m$^3$;
wherein the liquid-absorbent foam polymer has limited compressibility when a weight is applied;
wherein the weight is an about 1 kg weight;
wherein the 1 kg weight is applied to a 2 cm×2 cm×1.2 cm sample of the foam polymer; and
wherein the volume of the foam polymer is compressed by less than about 10%;
wherein the liquid-absorbent foam polymer returns to approximately its original volume when the weight is removed;
wherein the liquid-absorbent foam polymer is formed into particles of about 0.5 inches or less; and
a non-foam component;
wherein the weight ratio of the liquid-absorbent foam polymer to non-foam component is in the range of about 10:1 to 1:10; and
wherein the animal litter is liquid-absorbent.

9. The animal litter of claim 8,
wherein the non-foam component comprises liquid-absorbing clay;
wherein the non-foam component has a non-foam component density in the range of about 800 to 2000 kg/m$^3$;
wherein the ratio of the density of the liquid-absorbent foam polymer to the non-foam component density is from about 1:10 to about 1:1; and
wherein the animal litter is cat litter for a cat litter box.

10. The animal litter of claim 9, wherein the volume of the foam polymer is compressed from about 4 to 8%.

11. The animal litter of claim 10, wherein the animal litter is completely dust-free.

12. The animal litter of claim 11, wherein the liquid-absorbent foam polymer is a polyurethane foam.

13. The animal litter of claim 12, wherein the liquid-absorbent foam polymer is cut, shredded, extruded, molded, or spray dried to particles of less than about 0.5 inches on its longest side.

14. The animal litter of claim 13, wherein the liquid-absorbent foam polymer is cut into a polyhedron.

15. The animal litter of claim 14, wherein the liquid-absorbent foam polymer is cut into a rectangular polyhedron about 0.375 inches or less in size.

16. An animal litter comprising a liquid-absorbent foam polymer,
wherein the liquid-absorbent foam polymer is compressible and resilient foam having a density in the range of about 325 to 650 kg/m$^3$;
wherein the liquid-absorbent foam polymer is a polyurethane foam;
wherein the liquid-absorbent foam polymer has limited compressibility when a weight is applied;
wherein the liquid-absorbent foamed polymer returns to approximately its original volume when the weight is removed;
wherein the weight is a 1 kg weight applied to a 2 cm×2 cm×1.2 cm sample of the liquid-absorbent foam polymer;
wherein the volume of the liquid-absorbent foam polymer is compressed by less than about 10%;
wherein the animal litter is completely dust-free;
wherein the liquid-absorbent foam polymer is cut, shredded, extruded, molded, or spray dried to particles of less than about 0.5 inches on its longest side; and
wherein the animal litter is liquid-absorbent.

17. The animal litter of claim 16, wherein the volume of the liquid-absorbent foam polymer is compressed from about 4 to 8%, and wherein the liquid-absorbent foam polymer particle shape is a polyhedron.

18. The animal litter of claim 17, wherein the liquid-absorbent foam polymer particle shape is a rectangular polyhedron from about 0.1 to 0.375 inches in size.

* * * * *